United States Patent [19]

Suzuki

[11] Patent Number: 4,763,199
[45] Date of Patent: Aug. 9, 1988

[54] IMAGE PROCESSING APPARATUS AND METHOD OF ADJUSTING SAME

[75] Inventor: Yoshiyuki Suzuki, Kawasaki, Japan

[73] Assignee: Canon Kabushiki Kaisha, Tokyo, Japan

[21] Appl. No.: 919,763

[22] Filed: Oct. 16, 1986

[30] Foreign Application Priority Data

Oct. 17, 1985 [JP] Japan .................................. 60-229958

[51] Int. Cl.⁴ ............................................. H04N 1/04
[52] U.S. Cl. ..................................... 358/280; 358/282; 358/283
[58] Field of Search ............... 358/280, 282, 283, 298, 358/293

[56] References Cited

U.S. PATENT DOCUMENTS 4,626,923 12/1986 Yoshida ................................ 358/283
4,633,327 12/1986 Roetling ............................... 358/283

Primary Examiner—Edward L. Coles, Sr.
Attorney, Agent, or Firm—Fitzpatrick, Cella, Harper and Scinto

[57] ABSTRACT

An image processing apparatus includes; an image data inputting unit; a unit, including a reference conversion characteristic for use in changing the characteristic of the image data, for producing conversion data for the image data based on the reference characteristic and predetermined correction parameters; and a unit for outputting a pulse-width modulated signal using the conversion data and a pattern signal having a predetermined period; wherein the predetermined parameters are associated with the pattern signal.

14 Claims, 6 Drawing Sheets

IMAGE PROCESSING APPARATUS AND METHOD OF ADJUSTING SAME

BACKGROUND OF THE INVENTION

1. Field of the Invention

The present invention relates to an image processing apparatus and a method of adjusting the same for obtaining a reproduced image.

2. Related Background Art

A method of reproducing a half-tone image by using a laser beam printer or the like has been proposed by the same applicant of this application, wherein inputted digital image information is converted into analog image information which is compared with a periodical analog pattern signal such as a triangular signal to obtain pulse-width-modulated and binarized image information.

FIG. 4 shows a circuit diagram embodying this method. In the figure, an inputted 8-bit digital video signal $VD_0$ to $VD_7$ is latched by a latch circuit 1 in synchro with a video clock signal $\frac{1}{2}CLK$. The output $VD_0$ to $VD_7$ of the latch circuit 1 is inputted to a gain selection means (ROM) 16 at its address bits $A_0$ to $A_7$ to read a digital video signal $VR_0$ to $VR_7$ whose amplitude and bias level have been changed from those of the digital video signal $VR_0$ to $VR_7$. The digital video signal $VR_0$ to $VR_7$ is converted into an analog video signal VA by a D/A converter 2 which analog video signal VA is converted into a desired voltage level by a resistor 3 to apply it to one input terminal of an analog comparator 4. A master clock signal CLK is divided by n at a frequency divider 6 to provide a clock signal 1/n CLK which is then divided by 2 at a J-K flip-flop 8 to provide a pattern clock signal PCLK having a duty ratio of 50%. Thus, the pattern clock signal PCLK has a period n times as long as that of the video clock signal $\frac{1}{2}$ CLK. The pattern clock signal PCLK is then inputted via a buffer 9 to an integration circuit composed of a resistor 10 and a capacitor 11 to provide a triangular signal (analog pattern signal) SAW having the same period as that of the pattern clock signal PCLK. The bias component of the triangular signal SAW is adjusted by a capacitor 12 and a resistor circuit 13-1, 13-2 and applied to the other terminal of the comparator 4 via a protection resistor 14 and a buffer amplifier 15. The comparator 4 compares the analog video signal VA and the triangular signal SAW so that the analog video signal SAW is pulse-width-modulated in accordance with its density to thereby output a pulse-width modulated signal Pw from the comparator 4. An unrepresented laser driver operates based on the pulse-width-modulated signal to modulate a recording beam. To achieve a good tone property with this circuit, it is desirable to have a relation, as shown in FIG. 6, between the levels of the analog video signal VA and the triangular signal SAW. In particular, the relation is that the maximum level VAmax (e.g., black level) of the analog video signal VA coincides with the peak level of the triangular signal SAW, and that the minimum level VAmin (e.g., white level) of the analog video signal VA coincides with the bottom level of the triangular signal SAW. Such a relation ensures a maximum resolution and a full scale linearity.

Apart from the above, images reproduced with such a circuit have various image tones (image characteristic or property). For instance, as to a character image, reproducing pixels changing from white to black or vice versa with high fidelity is more important than reproducing half-tone, while as to a picture image, reproducing half-tone is more important. Therefore, the circuit of FIG. 4 is arranged to select the period of the pattern clock signal PCLK depending on which tone property is to be reproduced emphatically. In particular, the frequency divider 6 can change its division ratio, e.g., 1 to n in accordance with a period selection signal SEL. During reproducing a character image, the division ratio is set at 1 for example. As a result, one pixel of the inputted digital video signal is pulse-width-modulated using one triangular signal SAW so that pixels changing from white to black or vice versa can be reproduced with high fidelity. On the other hand, during reproducing a picture image, the division ratio is set at n for example. As a result, n pixels of the inputted digital video signal are pulse-width-modulated using one triangular signal SAW so that an image of smooth tone property can be reproduced. With this circuit, however, when the division ratio is switched, not only the period of the triangular signal SAW but also its amplitude and bias are changed, to thereby become unable to satisfy the relation of FIG. 4. In view of this, ROM 16 has been incorporated to change the amplitude and bias of the video data VA in response to changing the period. In particular, ROM 16 stores image data conversion tables TABL1 to TABL4 which define four combinations of gain G and bias B, as exemplarily shown in FIG. 5. One of the combinations is selected based on the period selection signal SEL. The table selection is made when the frequency divider 6 changes its division ratio. Thus, the gain and bias to be used for the inputted image information is changed when the period of the periodical pattern signal SAW is changed, thereby always making the peak and bottom values of the triangular signal SAW respectively coincide with the maximum and minimum values VAmax and VAmin of the image information VA subjected to gain conversion (or $\gamma$ conversion). For example, if a designated period $T_1$ is short, gain $G_1$ is set small and bias $B_1$ is set large, whereas if a designated period $T_3$ is long, gain $G_3$ is set large and bias $B_3$ is set small. To perform such function, ROM 16 has a capacity of 1k bytes, wherein bits $D_0$ to $D_7$ of the digital video signal are inputted to lower 8 bits $A_0$ to $A_7$ of the address terminals, and the period selection signal SEL is applied to upper 2 bits $A_8$ and $A_9$. Thus, it is possible to change the conversion table for the analog video signal VA simultaneously with switching the period of the triangular signal SAW.

However, values of the elements (resistor 10, capacitor 11 and so on) constituting the triangular signal generating circuit may disperse in practice, so the smplitude and bias of the triangular signal SAW may also disperse. Consequently, provision of only a single table for each designated period is not sufficient for compensating a small deviation caused by such dispersion. If tables were to be provided in one-to-one correspondence with all possible triangular signals SAW generated from such dispersion of the circuit elements, the number of tables becomes extraordinarily large and is not applicable to practical use.

SUMMARY OF THE INVENTION

It is an object of the present invention to eliminate the above-described disadvantages.

It is another object of the present invention to provide an improved image processing apparatus and a method of adjusting the same.

It is a further object of the present invention to provide an image processing apparatus and a method of adjusting the same, capable of reproducing an image of high quality.

It is a still further object of the present invention to provide an image processing apparatus and a method of adjusting the same, capable of reproducing a superior image with a simple construction.

It is another object of the present invention to provide an image processing apparatus and a method of adjusting the same, capable of reproducing an image of high quality at high speed.

It is a further object of the present invention to provide an image processing apparatus and a method of adjusting the same, capable of reproducing an image having both superior tone property and resolution.

It is a still further object of the present invention to provide an image processing apparatus and a method of adjusting the same, capable of pulse-width-modulating in a most suitable manner for the tone property of an image.

Other objects of the present invention will become apparent from the following description taken in connection with the accompanying drawings, and the appended claims.

DETAILED DESCRIPTION OF THE PREFERRED EMBODIMENTS

Figure 1:
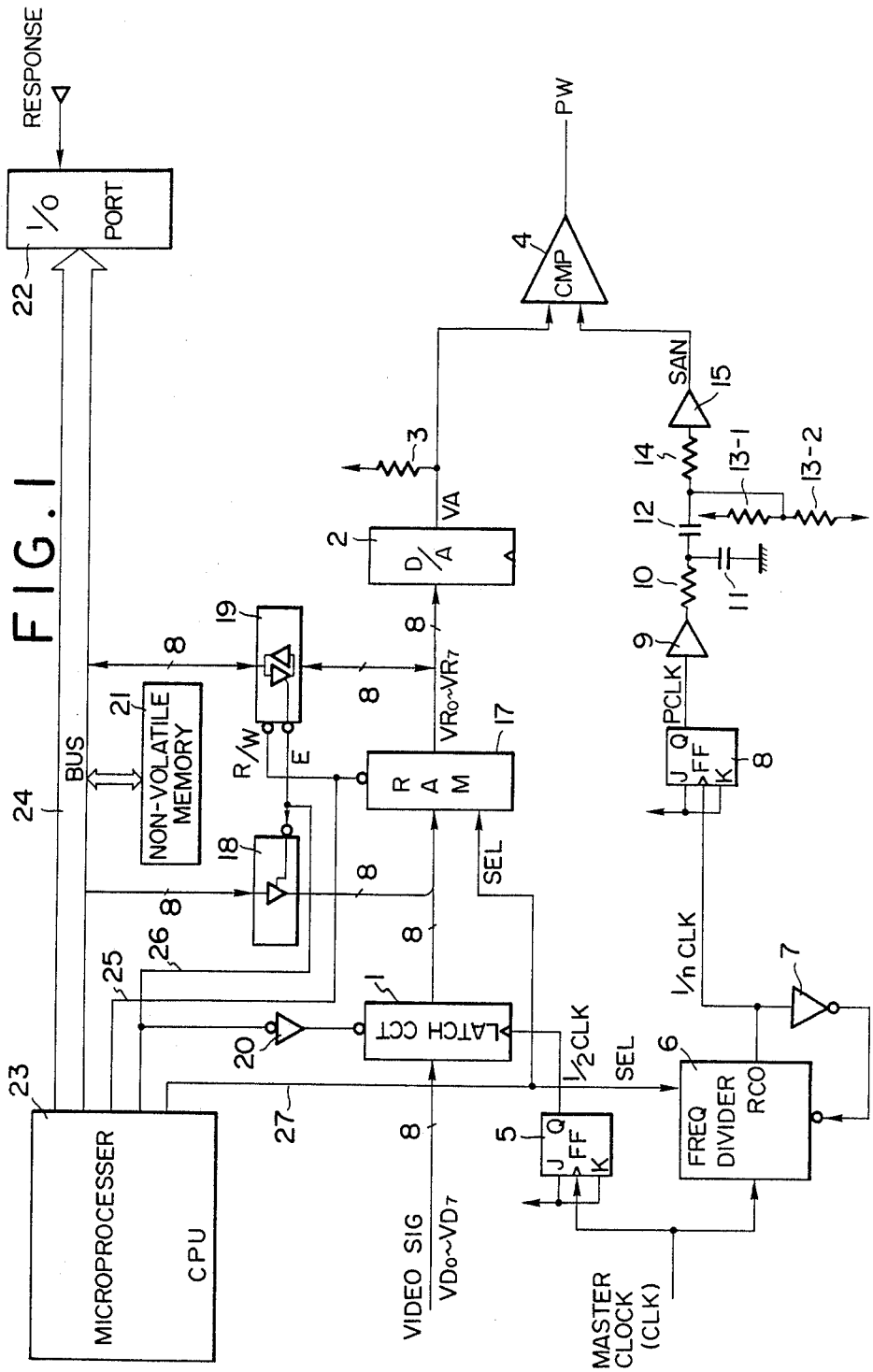
FIG. 1 is a circuit diagram of an embodiment of the image processing apparatus.
Figure 2:
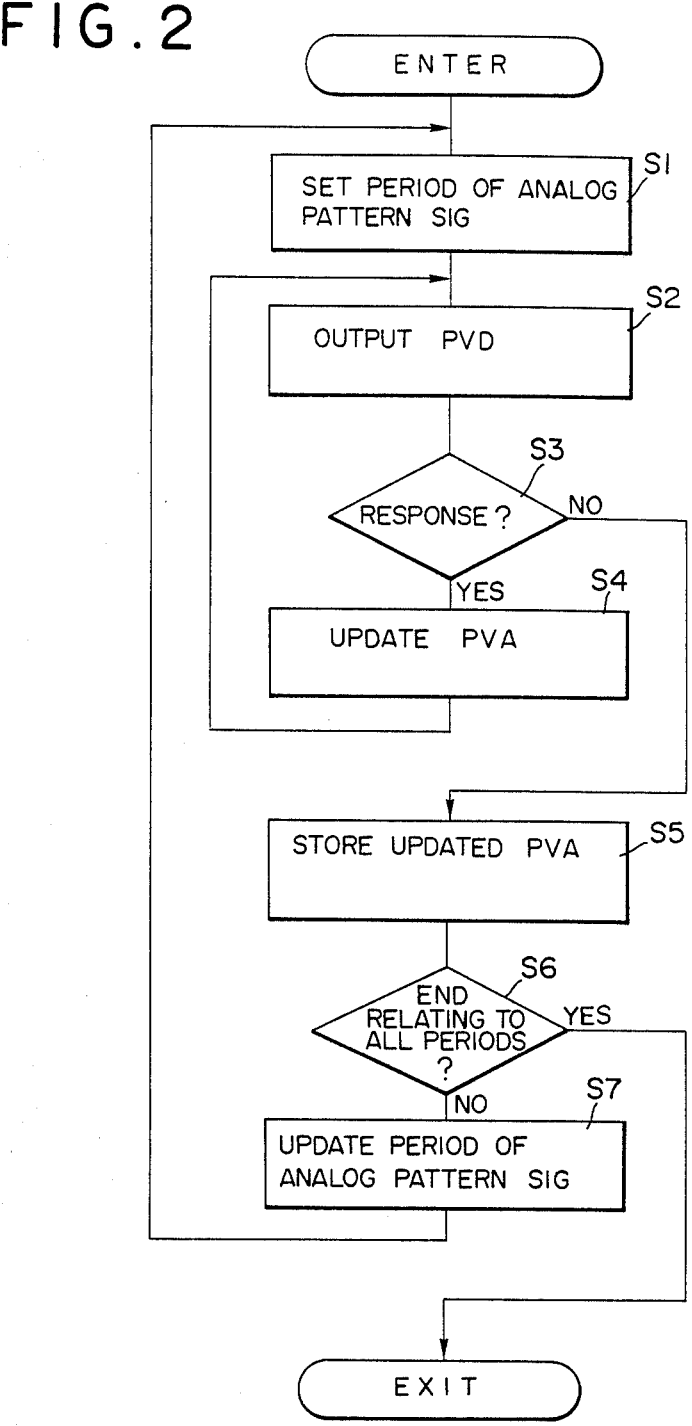
FIG. 2 is a flow chart showing the procedure of matching the reference triangular signal level and the video signal level.
Figure 3A:
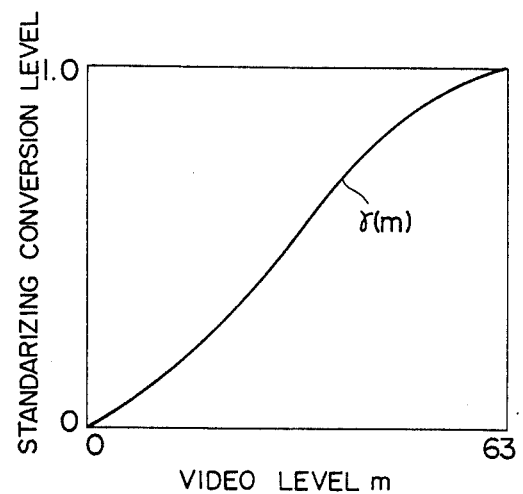
FIGS. 3A and 3B are views for illustrating conversion tables of the embodiment.
Figure 3B:
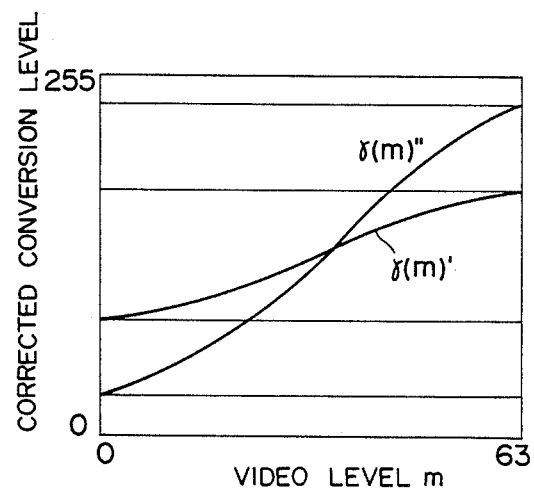
Figure 4:
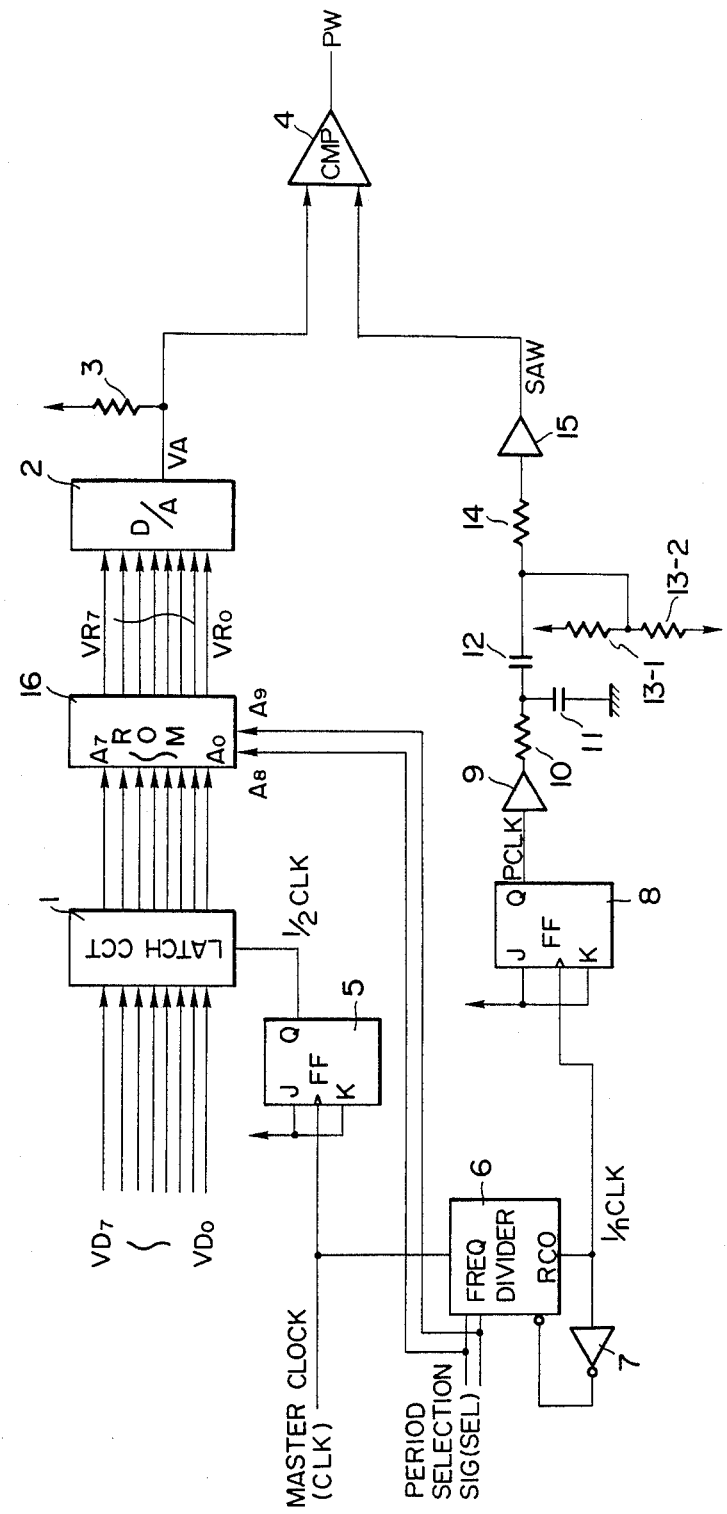
FIG. 4 is a circuit diagram showing an example of an image processing apparatus which compares image information with periodical pattern information and outputs pulse-width-modulated and binarized image information.
Figure 5:
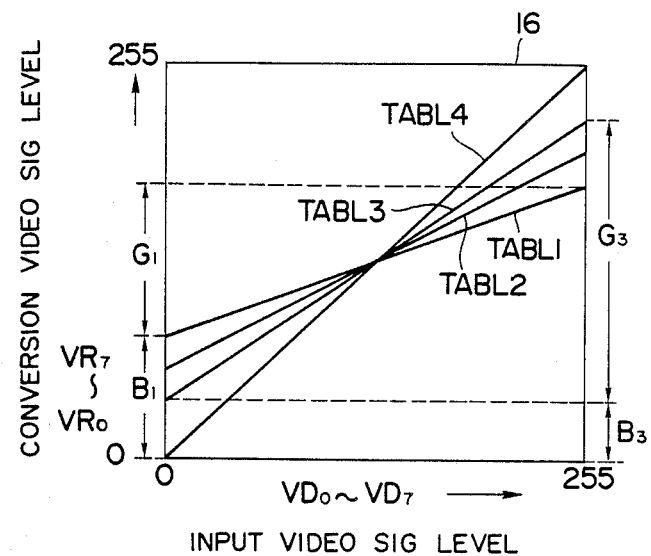
FIG. 5 shows an example of a conversion table.
Figure 6:
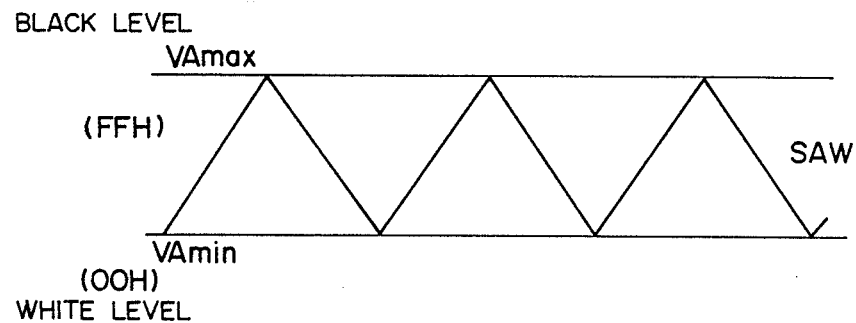
FIG. 6 is a view showing a most suitable relation between a triangular signal SAW and the density level of an analog image signal VA.

A preferred embodiment of the present invention will now be described with reference to the accompanying drawings. FIG. 1 to FIGS. 3A and 3B are for illustrating the embodiment: FIG. 1 is a circuit diagram of the embodiment of the image information apparatus; FIG. 2 is a flow chart showing the procedure of matching a reference triangular signal level and a video signal level; and FIGS. 3A and 3B are views showing conversion tables of the embodiment. Same reference numerals have been used in FIG. 1 for designating elements similar to those in FIG. 4.

Referring to FIG. 1, a random access memory (RAM) 17 which can read and write data is provided for storing conversion tables $\gamma(m)'$, $\gamma(m)''$ shown in FIG. 3(B) and the like. A tri-state buffer 18 has output states including logical 1 level (HIGH level) and logical 0 level (LOW level), and in addition high impedance level. Reference numeral 19 represents a bidirectional tri-state buffer, 1' a tri-state latch circuit, 20 an inverter, 21 a non-volatile memory for storing information to be used in forming the conversion tables $\gamma(m)'$, $\gamma(m)''$ and the like, 22 an I/O port for receiving response information on a matching condition, 23 a microprocessor (CPU) for executing a process of forming the conversion tables $\gamma(m)'$, $\gamma(m)''$ and the like based on predetermined programs, and 24 a common bus for CPU 23.

Address lines of the bus 24 are connected to address lines of RAM 17 via the tri-state buffer 18, while data lines of the bus 24 are connected to data lines of RAM 17 via the bidirectional tri-state buffer 19. When a buffer enable signal E sent from CPU 23 via line 26 becomes LOW, the tri-state buffers 18 and 19 are both enabled to output signals therefrom, and the latch circuit 1' takes a high impedance state in response to a signal E/ (/ means negative logic) inverted by the inverter 20. Therefore, in this condition, CPU 23 can access RAM 17. In this case, when data is written in RAM 17 under control of CPU 23, a read/write signal R/W sent via line 25 becomes LOW level to perform data writing. Contrary, when a read/write signal R/W is made HIGH level, the content of RAM 17 can be read under control of CPU 23. Further, when CPU 23 makes a buffer enable signal E HIGH level, the tri-state buffers 18 and 19 both take a high impedance state to make the output of the latch circuit 1' enabled. In this condition, video data $VD_0$ to $VD_7$ can be applied as an address to bit terminals $A_0$ to $A_7$ of RAM 17, to thereby make it possible to change video data $VD_0$ to $VD_7$ in accordance with the content of RAM 17. Switching the period of a triangular signal SAW can be carried out similarly as described with FIG. 4, in response to a period selection signal SEL sent from CPU 23 via line 27. The period selection signal SEL is also applied to the upper address bits $A_8$ and $A_9$ of RAM 17 to change the conversion tables within RAM 17.

A method of matching the levels of the triangular signal SAW and the analog video signal VA will be described with reference to the circuit constructed as above. Under control of CPU 23, the matching procedure shown in FIG. 2 is executed, while the information processing apparatus is manufactured or adjusted correctly. Thus, information necessary for the conversion tables satisfying the dispersion of circuit elements, is produced. At step S1, the period of an analog pattern signal is set. That is, CPU 23 sends a period selection signal SEL to the frequency divider 6. The period n is 1 for example, at the start of the procedure. The integration circuit generates a triangular signal SAW suitable for the period n. At step S2, preset video data PVA is outputted by enabling the tri-state buffers 18 and 19. The value of the preset video data PVA is determined to have a value slightly smaller than the peak level SAWmax of the triangular signal SAW in case of adjusting a black level, while in case of a while level the value of the preset video data is determined to have a value slightly larger than the bottom level SAWmin of the triangular signal SAW. The preset video data may be applied directly to the D/A converter 2 from CPU 23 via the buffer 19, or temporarily stored in RAM 17 and then applied to the D/A converter 2. In this condition, a response from the I/O port 22 is waited to judge if the level of the preset video data PVA matches the peak level SAWmax of the triangular signal.

Various methods of responding from the I/O port may be used. For example, both waveforms of the preset video data and the triangular signal may actually be observed using an instrument such as an oscilloscope to manually actuating a switch or the like for sending a response from the I/O port. Also, a signal waveform from the comparator 4 may be used for such observation. In particular, in case of adjusting a black level, a pulse of a certain duty ratio is outputted from the comparator 4 on condition that SAWmax>PVA, so that a response is possible based on the certain duty ratio. Or a change (rising or falling) in such a pulse is detected, then an information representing the existence of the pulse is directly fed back to the I/O port 22. Similarly, in case of adjusting a white level, a pulse of another certain duty ratio is outputted from the comparator 4 on condition that SAWmin<PVA. Other methods of responding from the I/O port 22 are: judging a level matching condition based on the light quantity of a laser beam driven by the output signal of the comparator 4; judging a level matching condition based on a surface potential of a photosensitive member to which a laser beam of an electrophotographing recording apparatus is applied; or judging based on a density or the like of a recorded medium.

In any method, a response indicating a presence of a pulse of a certain duty ratio, can be given to the I/O port 22 on condition that SAWmax>PVA in case of adjusting a black level. In this case, at step S4 the level of the preset video data PVA is slightly increased to thereafter follow step S2. Alternatively, in case of adjusting a white level, a response indicating a presence of a pulse of another duty ratio, can be given to the I/O port 22 on condition that SAWmin<PVA. Therefore, in this case, at step S4 the level of the preset video data PVA is slightly decreased to thereafter follow step S2. The above operations are repeated until a response disappears, and thereafter the flow advances to step S5. At step S5 data PVAP (or data PVAB in case of white level adjustment) applied to the D/A converter 2 by way of CPU 23 at that time is stored. At step S6 it is judged whether data PVAP and PVAB for all the periods of the triangular signal to be used has been stored or not. If not, step S7 follows to update a designated period to n=2. If affirmative, the procedure is terminated.

In the above method, the procedure starts from a presence of a response and terminates at an absence of a response. Conversely, it may start from an absence of a response and terminate at a presence of a response. In this case, the initial set value at step S2 of the preset video data PVA is determined to have a value slightly larger than the peak level SAWmax of the triangular signal SAW in case of adjusting a black level. In case of adjusting a white level, the value is determined to have a value slightly smaller (more negative) than the bottom level SAWmin of the triangular signal SAW. Thus, updating the PVAP and PVAB at step S4 is conducted starting from an absence of a response and terminating at a presence of a response.

Next, CPU 23 conducts to calculate conversion tables shown in FIG. 3B based on data PVAP and PVAB for all the periods of the triangular signal. In this case, CPU 23 can access a reference conversion table $\gamma(m)$ shown in FIG. 3A which may be stored in the non-volatile memory 21. In the figures, m indicates a level of a video signal VA and is 0 to 63 if a 6-bit data is used. The value of $\gamma(m)$ is normalized to have 1.0 for a black level and 0 for a white level. Using the data PVAB and PVAP of black and white levels obtained in the above adjustment procedure, the conversion values $\gamma(m)'$ for each video level m are calculated in accordance with the following equation.

$$\gamma(m)' = (PVAP - PVAB)\gamma(m) + PVAB \qquad (1)$$

Data calculated using the equation (1) is written in RAM 17 by way of CPU 23. FIG. 3B shows the conversion curve $\gamma(m)'$ calculated as above as well as the conversion curve $\gamma(m)''$ for a triangular signal SAW having a different period.

The non-volatile memory 21 stores, as described previously, the data PVAP and PVAB. The reason for this is that since the data PVAP and PVAB once obtained is characteristic values of the apparatus, the conversion tables $\gamma(m)'$ and $\gamma(m)''$ can be calculated by referring to the data PVAP and PVAB and the table $\gamma(m)$ and written in RAM 17 after the power supply of the apparatus is turned on.

Figure 7:
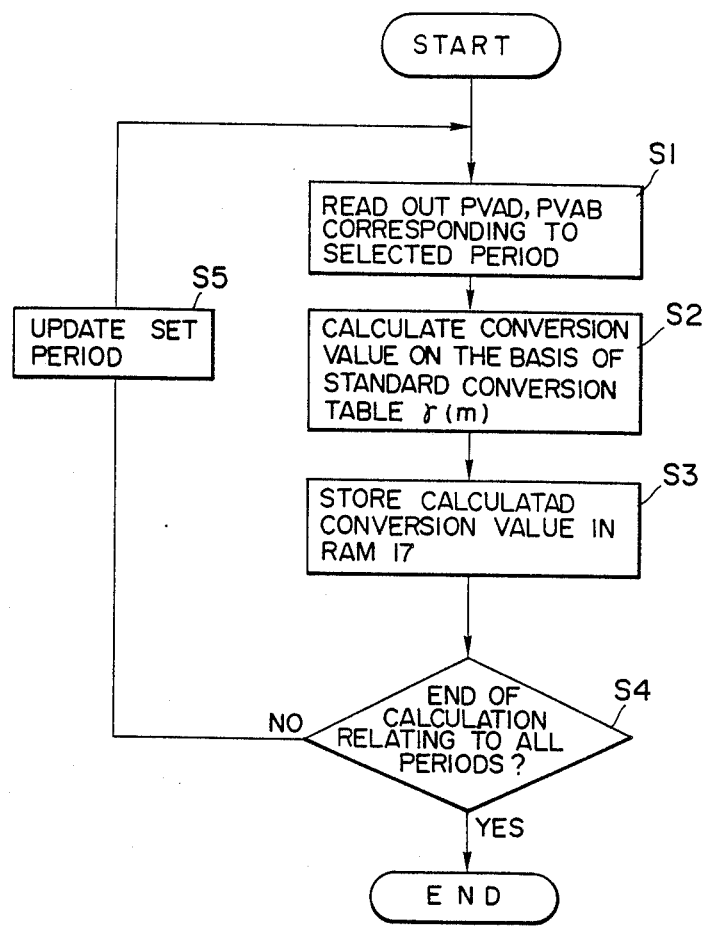
FIG. 7 is a flow chart showing the procedure of storing a calculated conversion table into RAM 17.

FIG. 7 is a flow chart showing the procedure of making the conversion tables $\gamma(m)'$ and $\gamma(m)''$ and writing them into RAM 17 by way of CPU 23, the procedure of the flow chart being stored in a ROM of CPU 23 in the form of programs.

At step S1 data PVAP and PVAB for the first period of the pattern signal is read from the non-volatile memory 21, and the flow advances to step S2 where the conversion values $\gamma(m)'$ for example are calculated using the equation (1). Next, at step S3 all the calculated conversion values are stored in RAM 17. After completion of storing the conversion values, step S4 follows where it is judged if the conversion values for all the periods of the pattern signal have been calculated or not. If not, step S5 follows. If affirmative at step S4, the procedure is terminated. At step S5, a set period is updated to make a conversion table for the second period of the pattern signal, and thereafter step S1 resumes for execution of similar operations described as above.

As described previously, the period of the analog pattern signal SAW is arranged to be switchable, and the corresponding and corrected one of a plurality of conversion tables $\gamma(m)'$ and $\gamma(m)''$, is selected.

In the above embodiment, although a triangular waveform has been used as the analog pattern signal, analog pattern signals of a different waveform are also applicable.

As described in the foregoing, the image processing apparatus according to the embodiment shown in FIG. 1 is provided with: a non-volatile storage means 21 for storing the reference conversion characteristic $\gamma(m)$ and its associated correction parameters PVAP and PVAB which are used to change the gain of inputted image information $VD_0$ to $VD_7$; a calculation means (CPU) 23 for calculating a corrected gain conversion characteristic $\gamma(m)'$ on the basis of the reference conversion characteristic $\gamma(m)$ read out of the storage means 21 and the correction parameters PVAP and PVAB caused by dispersion of the values of circuit elements of the periodical pattern signal generating circuit; a gain changing means (RAM) 17 for storing the conversion characteristic $\gamma(m)'$ outputted from the calculation means 23 and for reading gain-corrected (or $\gamma$-converted) image information $VR_0$ to $VR_7$ using as an address the inputted image information $VD_0$ to $VD_7$.

The present invention is not intended to be limited to the above-described embodiment alone, but various alterations are possible within the scope of the appended claims.

I claim:

1. An image processing apparatus comprising:
   image data inputting means;
   means, including a reference conversion characteristic for converting the characteristic of said image data, for producing conversion data for said image data based on said reference characteristic and at least one predetermined correction parameter; and
   means for outputting a pulse-width modulated signal using said conversion data and a pattern signal having a predetermined period;
   wherein said predetermined parameter is associated with said pattern signal.

2. An image processing apparatus according to claim 1, wherein said conversion data producing means includes first storage means for storing said predetermined correction parameter which is associated with at least one limit values of said pattern signal.

3. An image processing apparatus according to claim 2 further comprising second storage means for storing said conversion data produced by said conversion data producing means.

4. An image processing apparatus according to claim 3, wherein said pulse-width-modulated signal outputting means includes:
   means for D/A converting said conversion data outputted from said second storage means;
   means for outputting said pattern signal having a predetermined period; and
   comparison means for comparing an analog image data outputted from said D/A conversion means with said pattern signal and for outputting a pulse-width-modulated signal.

5. An image processing apparatus according to claim 4, wherein said pattern signal outputting means changes the period of a pattern signal to be generated based on a predetermined command signal, and said conversion data producing means produces said conversion data for each period of said pattern signal.

6. An image processing apparatus according to claim 5, wherein said pattern signal is a triangular signal.

7. An image processing apparatus comprising:
   image data inputting means;
   means for changing the characteristic of an image data inputted from said inputting means;
   means for outputting a pulse-width-modulated signal based on conversion data outputted from said characteristic changing means and a pattern signal having a predetermined period; and
   means for producing said conversion data to be stored in said characteristic changing means based on the amplitude of said pattern signal.

8. An image processing apparatus according to claim 7, wherein said conversion data producing means produces said conversion data for each period of said pattern signal.

9. An image processing apparatus according to claim 8, wherein said conversion data producing means includes a reference conversion characteristic for converting the characteristic of an image data inputted from said inputting means, and produces said conversion data based on said reference conversion characteristic and at least one limit value of said pattern signal.

10. An image processing apparatus according to claim 9 further comprising storage means for storing a parameter associated with the limit value of said pattern signal, wherein said conversion data producing means produces said conversion data based on said reference conversion characteristic and said parameter.

11. An image processing apparatus according to claim 10, wherein said pattern signal is a triangular signal.

12. An image processing apparatus according to claim 10, wherein said storage means is a non-volatile memory capable of data writing.

13. A method of adjusting an image processing apparatus which method compares image information with a pattern signal having a predetermined period and outputs a pulse-width-modulated signal, comprising the steps of:
    (a) setting a predetermined image information;
    (b) detecting a presence or absence of a pulse-width-modulated signal by comparing said predetermined image information with said pattern signal;
    (c) updating the set value of said image information, when a presence of said pulse-width-modulated signal is detected, to a value which results in an absence of said pulse-width-modulated signals, and returning to step (a); and
    (d) storing, when a presence of said pulse-width-modulated signal is not detected, a set value at that time.

14. A method of adjusting an image processing apparatus which method compares image information with a pattern signal having a predetermined period and outputs a pulse-width-modulated signal, comprising the steps of:
    (a) setting a predetermined image information;
    (b) detecting a presence or absence of a pulse-width-modulated signal by comparing said predetermined image information with said pattern signal;
    (c) updating the set value of said image information, when an absence of said pulse-width-modulated signal is detected, to a value which results in a presence of said pulse-width-modulated signal, and returning to step (a); and
    (d) storing, when a presence of said pulse-width-modulated signal is detected, a set value at that time.

* * * * *

UNITED STATES PATENT AND TRADEMARK OFFICE
CERTIFICATE OF CORRECTION

PATENT NO. : 4,763,199
DATED : August 9, 1988
INVENTOR(S) : Yoshiyuki Suzuki

It is certified that error appears in the above-identified patent and that said Letters Patent is hereby corrected as shown below:

FIGURE 1:

Block 23, "MICROPROCESSER" should read --MICROPROCESSOR--.

FIGURE 7:

Block S3, "CALCULATAD" should read --CALCULATED--.

COLUMN 1:

Line 64, "full scale" should read --full-scale--.

COLUMN 2:

Line 54, "smplitude" should read --amplitude--.

COLUMN 4:

Line 46, "elements," should read --elements--.

Line 57, "while level" should read --white level--.

UNITED STATES PATENT AND TRADEMARK OFFICE
CERTIFICATE OF CORRECTION

PATENT NO. : 4,763,199
DATED : August 9, 1988
INVENTOR(S) : Yoshiyuki Suzuki

It is certified that error appears in the above-identified patent and that said Letters Patent is hereby corrected as shown below:

COLUMN 5:

Line 3, "actuating" should read --actuate--.

COLUMN 7:

Line 18, "values" should read --value--.

COLUMN 8:

Line 34, "signals," should read --signal,--.

Signed and Sealed this

Twenty-first Day of November, 1989

*Attest:*

JEFFREY M. SAMUELS

*Attesting Officer*    Acting Commissioner of Patents and Trademarks